US010552051B2

(12) United States Patent
Joshi et al.

(10) Patent No.: US 10,552,051 B2
(45) Date of Patent: Feb. 4, 2020

(54) ALLOCATION OF HEAT-TIERED STORAGE AMONG THROTTLING UNITS

(71) Applicant: INTERNATIONAL BUSINESS MACHINES CORPORATION, Armonk, NY (US)

(72) Inventors: Ashwin M. Joshi, Pune (IN); Rahul M. Fiske, Pune (IN); Sandeep R. Patil, Pune (IN); Sasikanth Eda, Vijayawada (IN)

(73) Assignee: International Business Machines Corporation, Armonk, NY (US)

( * ) Notice: Subject to any disclaimer, the term of this patent is extended or adjusted under 35 U.S.C. 154(b) by 69 days.

(21) Appl. No.: 15/888,785

(22) Filed: Feb. 5, 2018

(65) Prior Publication Data
US 2019/0243557 A1     Aug. 8, 2019

(51) Int. Cl.
*G06F 3/06* (2006.01)
*H04L 29/08* (2006.01)

(52) U.S. Cl.
CPC .......... *G06F 3/0611* (2013.01); *G06F 3/067* (2013.01); *G06F 3/0631* (2013.01); *G06F 3/0634* (2013.01); *G06F 3/0644* (2013.01); *G06F 3/0647* (2013.01); *G06F 3/0653* (2013.01); *G06F 3/0658* (2013.01); *G06F 3/0664* (2013.01); *H04L 67/1097* (2013.01)

(58) Field of Classification Search
CPC .... G06F 3/0611; G06F 3/0613; G06F 3/0631; G06F 3/0634; G06F 3/0644; G06F 3/0647; G06F 3/0653; G06F 3/0658; G06F 3/0664; G06F 3/067; H04L 67/1097
USPC .......................................... 711/117, 158, 170
See application file for complete search history.

(56) References Cited

U.S. PATENT DOCUMENTS

| | | | |
|---|---|---|---|
| 9,026,765 B1 * | 5/2015 | Marshak | G06F 3/061 711/114 |
| 10,140,032 B1 * | 11/2018 | Faibish | G06F 3/0611 |
| 10,268,726 B1 * | 4/2019 | Schiesser | H04L 67/1097 |
| 2013/0166727 A1 | 6/2013 | Wright et al. | |
| 2013/0227111 A1 | 8/2013 | Wright et al. | |
| 2013/0312005 A1 * | 11/2013 | Chiu | G06F 3/061 718/105 |
| 2016/0231928 A1 | 8/2016 | Lewis et al. | |

* cited by examiner

*Primary Examiner* — Gary J Portka
(74) *Attorney, Agent, or Firm* — Brian F. Russell; Robert Sullivan (57) ABSTRACT

A data storage system has multiple tiers of data storage including an upper tier having a lower access latency and a lower tier having a higher access latency. A storage controller of the data storage system implements throttling limits regulating access to data in the data storage system for a plurality of throttling units sharing the data storage system. The storage controller also tracks access frequencies of extents in the data storage system. The storage controller migrates extents among the multiple tiers based on the access frequencies of the extents and the throttling limits implemented for the throttling units.

16 Claims, 6 Drawing Sheets

ALLOCATION OF HEAT-TIERED STORAGE AMONG THROTTLING UNITS

BACKGROUND OF THE INVENTION

This disclosure relates to data processing and data storage, and more specifically, to intelligent allocation of heat-tiered storage among throttling units.

In general, cloud computing refers to a computational model in which processing, storage, and network resources, software, and data are accessible to remote host systems, where the details of the underlying information technology (IT) infrastructure providing such resources is transparent to consumers of cloud services. Cloud computing is facilitated by ease-of-access to remote computing websites (e.g., via the Internet or a private corporate network) and frequently takes the form of web-based resources, tools or applications that a cloud consumer can access and use through a web browser, as if the resources, tools or applications were a local program installed on a computer system of the cloud consumer. Commercial cloud implementations are generally expected to meet quality of service (QoS) requirements of cloud consumers, which may be specified in service level agreements (SLAs). In a typical cloud implementation, cloud consumers consume computational resources as a service and pay only for the resources used.

Adoption of cloud computing has been facilitated by the widespread utilization of virtualization, which is the creation of virtual (rather than actual) versions of computing resources, e.g., an operating system, a server, a storage device, network resources, etc. For example, a virtual machine (VM), also referred to as a logical partition (LPAR), is a software implementation of a physical machine (e.g., a computer system) that executes instructions like a physical machine. VMs can be categorized as system VMs or process VMs. A system VM provides a complete system platform that supports the execution of a complete operating system (OS), such as Windows, Linux, Android, etc., as well as its associated applications. A process VM, on the other hand, is usually designed to run a single program and support a single process. In either case, any application software running on the VM is limited to the resources and abstractions provided by that VM. Consequently, the actual resources provided by a common IT infrastructure can be efficiently managed and utilized through the deployment of multiple VMs, possibly from multiple different cloud computing customers. The virtualization of actual IT resources and management of VMs is typically provided by software referred to as a VM monitor (VMM) or hypervisor.

In a typical virtualized computing environment, VMs can communicate with each other and with physical entities in the IT infrastructure of the utility computing environment utilizing conventional networking protocols. As is known in the art, conventional networking protocols are commonly premised on the well-known seven layer Open Systems Interconnection (OSI) model, which includes (in ascending order) physical, data link, network, transport, session, presentation and application layers. VMs are enabled to communicate with other network entities as if the VMs were physical network elements through the substitution of a virtual network connection for the conventional physical layer connection.

In the current cloud computing environments in which data storage systems and host systems can be widely geographically and/or topologically distributed and the volume of data can be in the petabytes (i.e., a so-called "big data" environment), it is desirable to provide low latency access to frequently accessed data, while still retaining (e.g., archiving) less frequently accessed data. To provide such low latency access to stored data, it is conventional to implement multiple tiers of data storage, with storage devices having smaller storage capacities, higher performance, and higher per-byte cost at the upper tiers and storage devices having larger storage capacities, lower performance, and lower per-byte cost at the lower tiers. Data are then distributed among the tiers based on a "heat" metric providing an indication of the frequency and/or recency of access, with "hotter" data (i.e., more frequently and/or recently accessed data) placed in the upper tiers and "colder" (i.e., less frequently and/or recently accessed data) placed in the lower tiers.

In order to meet QoS requirements, cloud computing environments generally implement resource utilization limits to restrict the utilization of computational and storage resources by the various cloud consumers sharing the physical cloud infrastructure to within agreed limits. These resource utilization limits may include, for example, input/output (I/O) throttling limits specifying a maximum allowed throughput (e.g., expressed in I/O operations per second (IOPS)) for a throttling unit, such as a cloud consumer, host device, Internet Protocol (IP) address, application (workload), volume group, and/or volume.

BRIEF SUMMARY

The present disclosure appreciates that one drawback of the application of a conventional heat-based tiering policy to a shared data storage system employing throttling limits is that the allocation of the capacity of one or more upper tiers of the shared tiered data storage system to the data of various QoS entities often does not reflect the differing service qualities of those QoS entities.

For example, consider a data storage system implementing a conventional heat-based tiering policy that is shared by two host devices, client A and client B, which are subject to a throttling policy that limits client A to 100 IOPS and client B to 200 IOPS. If client A performs more frequent I/O than client B despite its greater throttling restriction, the extents (i.e., contiguous blocks of storage) accessed by client A (i.e., the "hotter" extents) will be migrated to the lower latency upper tiers of storage. If the number of these extents is sufficiently high, the extents accessed by client B less frequently will tend to migrate to the higher latency lower tiers of storage. As a result of this data distribution, extents of files accessed by client A that have been migrated to the upper tier of storage, although available at very low read latency, may be held in the buffers of the upper tier of storage to satisfy the throttling limits to which client A is subject under its QoS. Data accessed by client B, on the other hand, is migrated to the higher latency storage tier(s), resulting in poor I/O throughput.

In an alternative configuration, a data storage system implementing a conventional heat-based tiering policy may implement throttling over multiple shared storage units, such as volumes or volume groups. For example, a first volume A may be limited to 100 IOPS, and a second volume B may be limited to 200 IOPS. Because the conventional heat-based tiering policy is unaware of the throttling configured for the volumes, hotter extents will be migrated to the upper storage tier(s) and colder extents will be migrated to the lower storage tier(s) without regard to the throttling limits of the volumes. As a result, the higher performance storage tier(s) can become predominantly filled with extents from volumes that have lower throttling limits (e.g., volume A) while extents from volumes having higher throttling limits (e.g., volume B) are migrated to the lower performance storage tier(s). As a result, the data in volume B to which access has been prioritized by the throttling limits suffers from reduced throughput.

The inefficiencies described in the two foregoing scenarios can be addressed through the implementation of a heat-based tiering policy that is aware of QoS throttling limits. For example, in one embodiment, a data storage system has multiple tiers of data storage including an upper tier having a lower access latency and a lower tier having a higher access latency. A storage controller of the data storage system implements throttling limits regulating access to data in the data storage system for a plurality of throttling units sharing the data storage system. The storage controller also tracks access frequencies of extents in the data storage system. The storage controller migrates extents among the multiple tiers based on the access frequencies of the extents and the throttling limits implemented for the throttling units.

DETAILED DESCRIPTION

Figure 1:
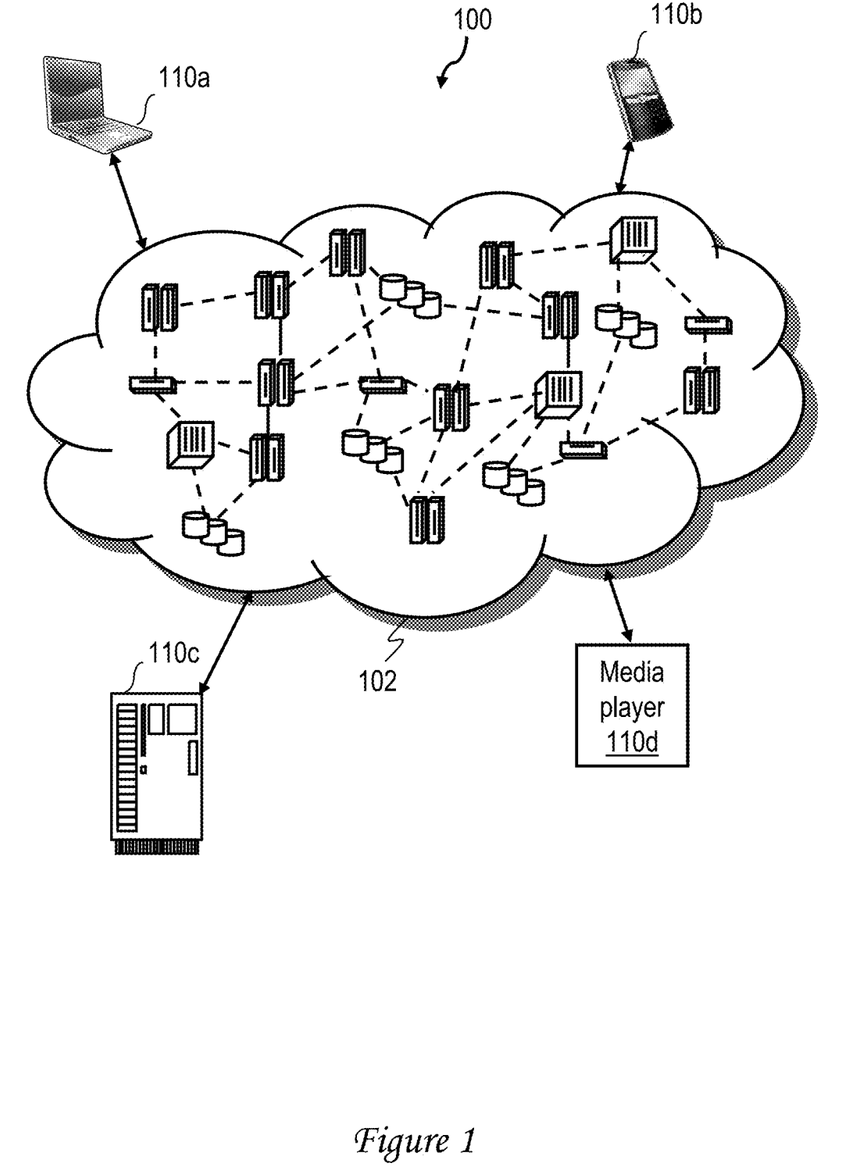
FIG. 1 is a high level block diagram of a data processing environment in accordance with one embodiment.

With reference now to the figures and with particular reference to FIG. 1, there is illustrated a high level block diagram of an exemplary data processing environment 100 in accordance within one embodiment. As shown, data processing environment 100, which in the depicted embodiment is a cloud computing environment, includes a collection of computing resources commonly referred to as a cloud 102. Computing and data storage resources within cloud 102 are interconnected for communication and may be grouped (not shown) physically or virtually, in one or more networks, such as private, community, public, or hybrid clouds or a combination thereof. In this manner, data processing environment 100 can offer infrastructure, platforms, and/or software as services accessible to host devices 110, such as personal (e.g., desktop, laptop, netbook, tablet or handheld) computers 110a, smart phones 110b, server computer systems 110c and consumer electronics, such as media players (e.g., set top boxes, digital versatile disk (DVD) players, or digital video recorders (DVRs)) 110d. It should be understood that the types of host devices 110 shown in FIG. 1 are illustrative only and that host devices 110 can be any type of electronic device capable of communicating with and accessing services of computing and data resources in collection 110 via a packet network.

Figure 2:
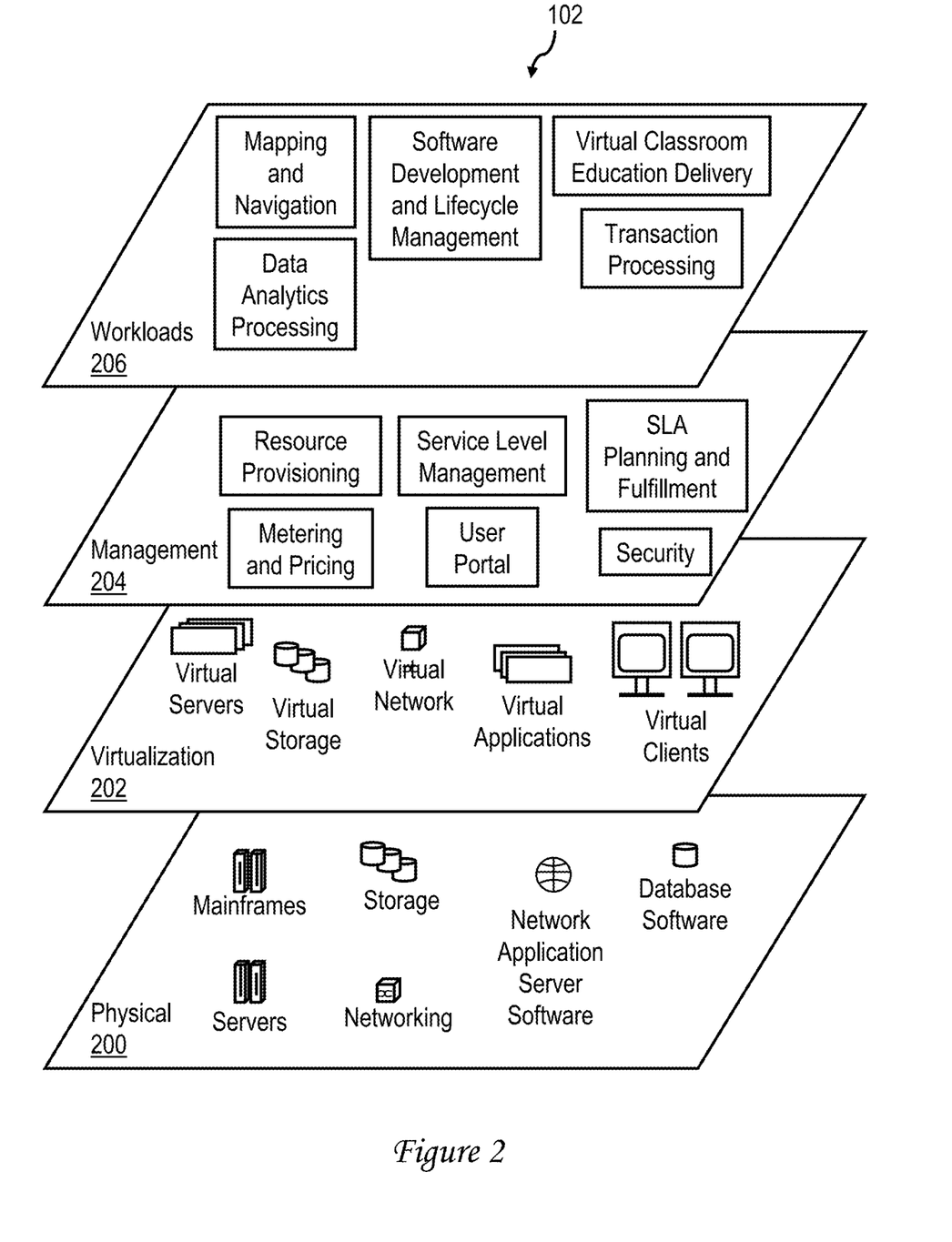
FIG. 2 depicts the layering of virtual and physical resources in the exemplary data processing environment of FIG. 1 in accordance with one embodiment.

FIG. 2 is a layer diagram depicting exemplary virtual and physical resources residing in collection of cloud 102 of FIG. 1 in accordance with one embodiment. It should be understood that the computing and data storage resources, layers, and functions shown in FIG. 2 are intended to be illustrative only and embodiments of the claimed inventions are not limited thereto.

As depicted, cloud 102 includes a physical layer 200, a virtualization layer 202, a management layer 204, and a workloads layer 206. Physical layer 200 includes various physical hardware and software components that can be used to instantiate virtual entities for use by the cloud service provider and its customers. As an example, the hardware components may include mainframes (e.g., IBM® zSeries® systems), servers (e.g., IBM pSeries® systems), data storage systems (e.g., flash drives, magnetic drives, optical drives, tape drives, etc.), physical networks, and networking components (e.g., routers, switches, etc.). The software components may include, for example, operating system software (e.g., Windows, Linux, Android, iOS, etc.), network application server software (e.g., IBM WebSphere® application server software, which includes web server software), and database software.

The computing resources residing in physical layer 200 of cloud 102 are virtualized and managed by one or more virtual machine monitors (VMMs) or hypervisors. The VMMs present a virtualization layer 202 including virtual entities (e.g., virtual servers, virtual storage, virtual networks (including virtual private networks)), virtual applications, and virtual clients. As discussed previously, these virtual entities, which are abstractions of the underlying resources in physical layer 200, may be accessed by host devices 110 of cloud consumers on-demand.

The VMM(s) also support a management layer 204 that implements various management functions for the cloud 102. These management functions can be directly implemented by the VMM(s) and/or one or more management or service VMs running on the VMM(s) and may provide functions such as resource provisioning, metering and pricing, security, user portal services, service level management, and service level agreement (SLA) planning and fulfillment. The resource provisioning function provides dynamic procurement of computing resources and other resources that are utilized to perform tasks within the cloud computing environment. The metering and pricing function provides cost tracking (as resources are provisioned and utilized within the cloud computing environment) and billing or invoicing for consumption of the utilized resources. As one example, the utilized resources may include application software licenses. The security function provides identity verification for cloud consumers and tasks, as well as protection for data and other resources. The user portal function provides access to the cloud computing environment for consumers and system administrators. The service level management function provides cloud computing resource allocation and management such that required service levels (i.e., QoS) are met. For example, the security function or service level management function may be configured to limit deployment/migration of a virtual machine (VM) image to geographical location indicated to be acceptable to a cloud consumer. The SLA planning and fulfillment function provides pre-arrangement for, and procurement of, cloud computing resources for which a future requirement is anticipated in accordance with an SLA.

Workloads layer 206, which may be implemented by one or more consumer VMs, provides examples of functionality for which the cloud computing environment may be utilized.

Examples of workloads and functions which may be provided from workloads layer 206 include: mapping and navigation; software development and lifecycle management; virtual classroom education delivery; data analytics processing; and transaction processing. Of course, in other environments alternative or additional workloads may be executed.

Figure 3:
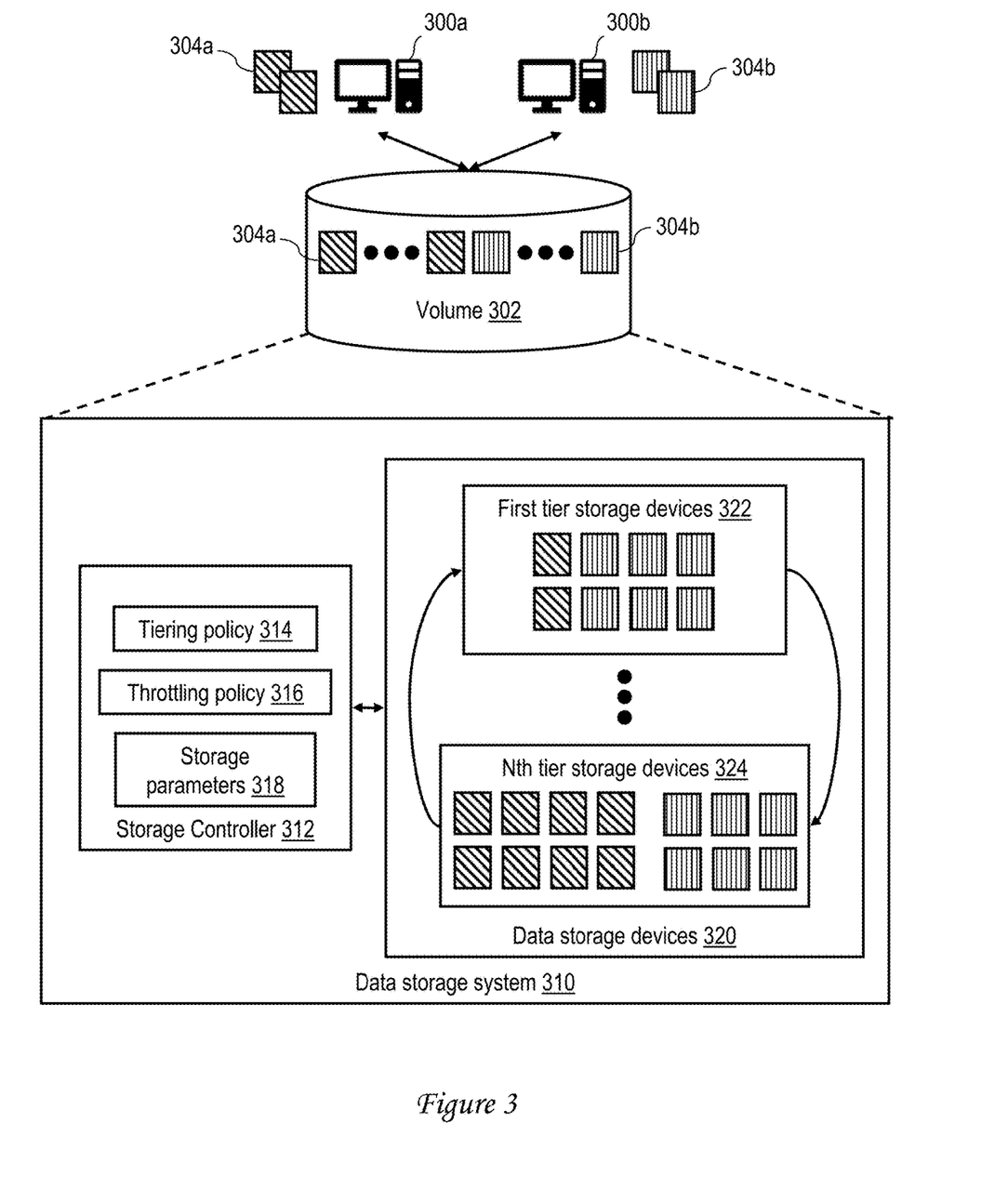
FIG. 3 is a high level block diagram of a first embodiment of a data storage system in the data processing environment of FIG. 1.

With reference now to FIG. 3, there is illustrated a high level block diagram of a first embodiment of an exemplary data storage system 310 within physical layer 200 of cloud 102. As shown, data storage system 310 includes at least one storage controller 312, which is coupled for communication with, and controls operation of, a collection of possibly heterogeneous data storage devices 320. Storage controller 312 may be implemented entirely in hardware or may include a hardware platform (e.g., a processor and associated memory) that executes firmware and/or software. Storage controller 312 manages data storage devices 320 in accordance with a heat-based tiering policy 314, which can be updated from time-to-time, for example, by a storage administrator of data storage system 310.

In accordance with storage policy 314, storage controller 312 preferably organizes and manages data storage devices 320 in multiple tiers, which can be formed, for example, based on the access latency, storage capacity, estimated useful lifetime, data storage duration, data priority, and/or other characteristics of stored data and/or the underlying storage media. In one preferred embodiment, the data storage devices 320 forming each of the various tiers of data storage devices 320 have similar access latencies. Thus, for example, first tier storage devices 322 can include one or more data storage devices, such as flash or other non-volatile memory devices, having relatively low access latencies as well as relatively low storage capacities. Data storage devices 320 further include one or more additional lower tiers including Nth tier storage devices 324. These lower storage tier(s), which generally employ storage media such as magnetic disks, tape drives, etc., having lower per-byte costs and higher access latencies than first tier storage devices 322, generally providing greater storage capacities than first tier storage devices 322.

In accordance with heat-based tiering policy 314, storage controller 312 also preferably maintains a respective heat attribute for each storage unit, which is hereinafter assumed to be an extent 304 (i.e., a contiguous block of storage smaller than a file), but in other embodiments can be a file or other storage object. The heat attribute indicates a frequency and/or recency of access to the associated storage unit and has a value that is preferably computed by storage controller 312 in accordance with a heat formula specified by tiering policy 314. In one particular example, the heat formula includes a built-in decay (e.g., an exponential decay) so that unaccessed extents 304 become colder as the time elapsed since the most recent access increases. In general, it is desirable if storage controller 312 maintains the hottest extents 304 (e.g., those most frequently accessed) in first tier storage devices 322, the next hottest extents 304 in a next lower tier of storage devices 320, if any, and the coldest extents 304 in Nth tier storage devices 324. This arrangement can be achieved, for example, by applying various heat thresholds specified by tiering policy 314 to distribute extents 304 among the various tiers 322, . . . , 324 based on the values of their heat attributes, subject to limitations consonant with a throttling policy 316 implemented by storage controller 312 and the access latencies and storage capacities of the various storage tiers, which are specified as part of a set of storage parameters 318 accessible to storage controller 312.

Throttling policy 316, which can also be defined and updated by a storage administrator of data storage system 310, establishes I/O limits with respect to data storage system 310 for each of a plurality of throttling units. For example, the throttling limits established by throttling policy 316 may be expressed in terms of accesses (e.g., IOPS) and/or data volume referenced by the accesses (e.g., GB/s). In various embodiments, the throttling units can be the targets of I/O accesses, such as the virtual, logical or physical storage units (e.g., volumes, volume groups, virtual disks (vdisks), managed disks (mdisks), physical disks (pdisks), etc). Alternatively or additionally, the throttling units for which throttling limits are defined can relate to the initiators of I/O accesses (e.g., host device, IP address, workload, process, etc.).

In the particular environment depicted in FIG. 3 the data stored within data storage system 310 is accessed by multiple client platforms 300a-300b, which can be virtual or physical platforms that are internal to cloud 102 or external to cloud 102 (e.g., host devices 110a-110d). The data stored within data storage system 310 is logically presented to client platforms 300 via virtualization layer 202 as a shared volume 302, which can, in turn, include one or more logical units (LUNs), not explicitly illustrated in FIG. 3. As indicated by distinct shading, the data stored within data storage system 310 and referenced via volume 302 includes both extents 304a accessed by client platform 300a and extents 304b accessed by client platform 300b.

In an environment such as that depicted in FIG. 3, client platform 300a may be restricted by storage controller 312 to a lower rate of access and/or a smaller volume of data access than client platform 300b in accordance with throttling policy 316 and may nevertheless access its extents 300a with greater frequency than client platform 300b accesses extents 300b. As discussed above, if storage controller 312 implemented a conventional heat-based tiering policy, this access behavior can result in the storage capacity of first tier storage devices 322 being predominately consumed by extents 304a rather than extents 304b of client platform 300b. However, in accordance with the present invention, storage controller 312 preferably avoids this storage imbalance by implementing heat-based tiering policy 314 in dependence on the relative priorities of the throttling units defined by throttling policy 316. As a result, even if client platform 300b accesses its extents 300a with greater frequency than client platform 300b accesses extents 300b, the storage capacity of first tier storage devices 322 will be predominantly allocated to extents 304b of client platform 300b, as shown in FIG. 3. Importantly, storage controller 312 maintains an appropriate allocation of the storage capacity of first tier storage devices 322 regardless of whether throttling policy 316 specifies throttling limits that are initiator-related (as shown in FIG. 3) and/or target-related (as discussed further below with reference to FIG. 4).

Figure 4:
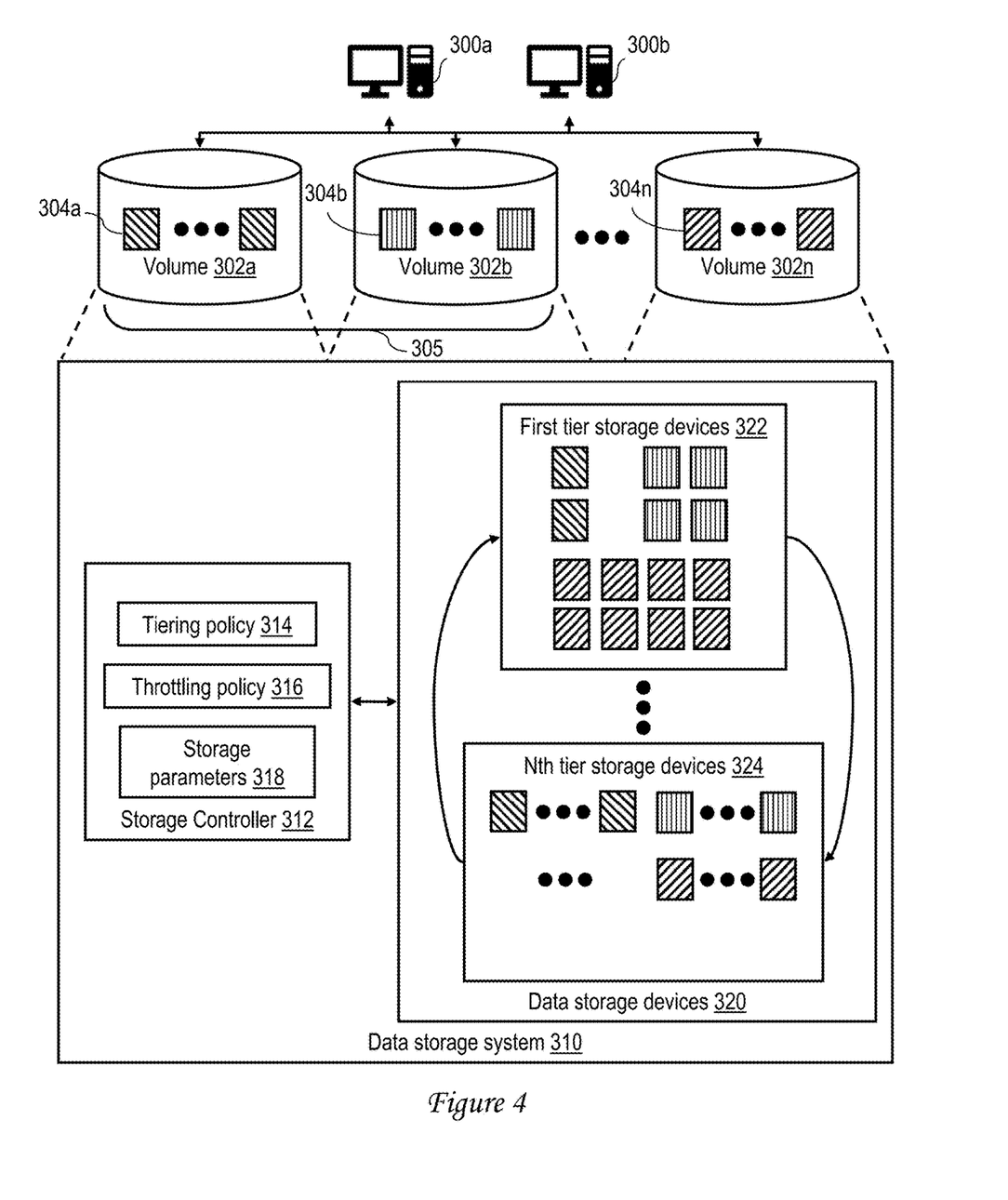
FIG. 4 is a high level block diagram of a second embodiment of a data storage system in the data processing environment of FIG. 1.

Referring now to FIG. 4, there is depicted a high level block diagram of a second embodiment of an exemplary data storage system 310 within physical layer 200 of cloud 102. As indicated by like numbering, the storage environment shown in FIG. 4 is the same as that illustrated in FIG. 3, except that the data within data storage system 310 is logically presented to client platforms 300a, 300b in a plurality of volumes 302a-302n (rather than as a single volume 302 as in FIG. 3) and the throttling policy 316 implemented by storage controller 312 applies target-related throttling limits to volumes 302a-302n (rather than the initiator-related throttling limits applied to client platforms 300a-300b in FIG. 3).

In the example of FIG. 4, throttling policy 316 establishes differing throttling limits for volumes 302a, 302b, . . . , 302n, respectively. For example, volumes 302a, 302b, and 302n may have respectively throttling limits of 100 IOPS, 200 IOPS and 400 IOPS. Throttling policy 316 may alternatively or additionally establish throttling limits for volume groups, such as volume group 305, which includes volumes 302a-302b. As explicitly illustrated in FIG. 4, based on the throttling limits specified by throttling policy 316, storage controller 312 implements heat-based tiering policy 314 so that extents 304n of volume 302n are allocated the largest proportion of the storage capacity in first tier storage devices 322, extents 304b of volume 302b are allocated the next largest proportion of the storage capacity in first tier storage devices 322, and extents 304a of volume 302a are allocated the smallest proportion of the storage capacity in first tier storage devices 322.

Figure 5:
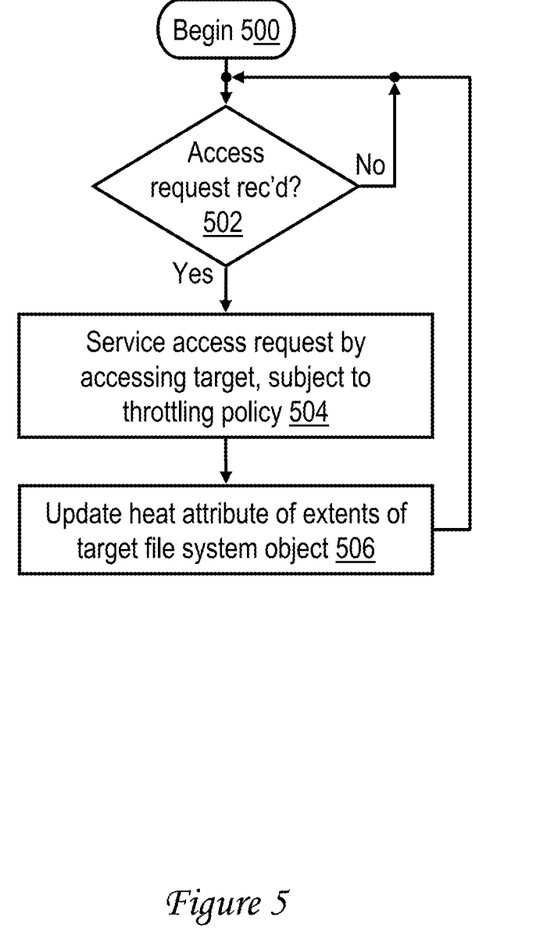
FIG. 5 is a high level logical flowchart of an exemplary process for updating the heat attribute of an extent of a file system object in accordance with one embodiment.

With reference now to FIG. 5, there is illustrated a high level logical flowchart of an exemplary process for updating the heat attribute of an extent of a file system object in accordance with one embodiment. For ease of understanding, the process shown in FIG. 5 (and the additional process given in FIG. 6) will be described with reference to the management of data storage system 310 performed by storage controller 312 in accordance with tiering policy 314 and throttling policy 316.

The process of FIG. 5 begins at block 500 and thereafter proceeds to block 502, which depicts storage controller 312 awaiting receipt of an access request (e.g., a read, write, or open request) from a workload executing either within cloud 102 or on an external system, such as a host device 110. In response to receipt of a request by storage controller 302, the process proceeds to block 504.

Block 504 depicts storage controller 312 servicing the access request (e.g., by opening, reading, and/or writing one or more extents 304 of a target file system object), subject to the limitations imposed on the access by throttling policy 316. In imposing the throttling limits, storage controller 312 may, for example, apply additional queuing delays to requests from one or more client platforms 300 and/or apply buffering latency to accesses of extents 304 residing in first tier storage devices 322.

In connection with the access performed at block 504, storage controller 312 also updates (e.g., increases) the heat attribute of the accessed extent(s) 304 of the target file system object to reflect the access (block 506). In some embodiments, the update to the heat attribute can be a simple incrementation of an access count for the accessed extent(s) 304. In other embodiments, the update depicted at block 506 may be further based on other extended factors, such as the type of access and/or the most recent access time to the extent 304. Thereafter, the process returns to block 502 and following blocks, which have been described.

Figure 6:
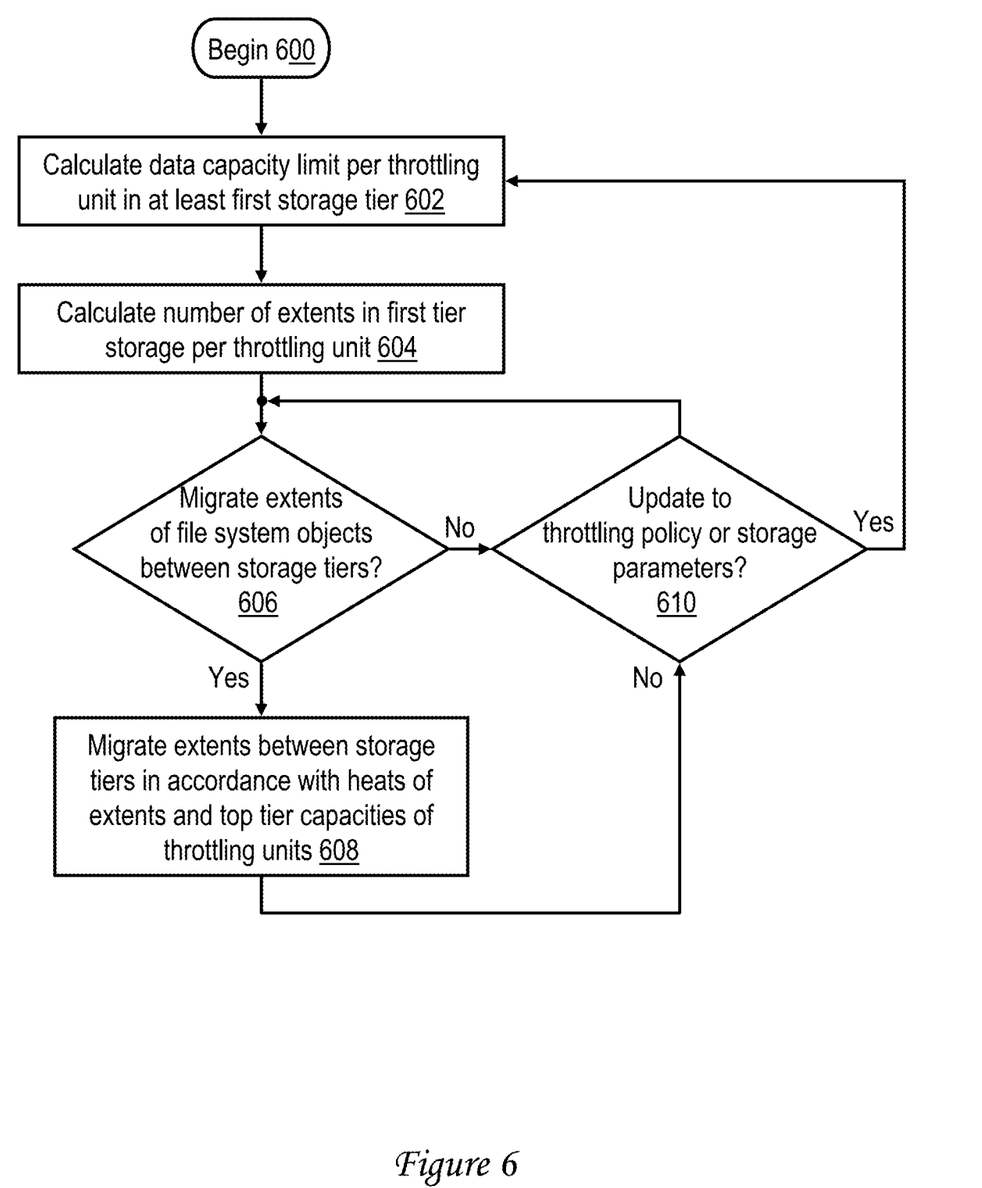
FIG. 6 is a high level logical flowchart of an exemplary process for managing migration of data in a heat-tiered data storage system in accordance with one embodiment.

Referring now to FIG. 6, there is depicted a high level logical flowchart of an exemplary process by which a storage controller, such as storage controller 312, implements heat-based management of a tiered data storage system in accordance with one embodiment. The process given in FIG. 6, while implementing heat-based tiering, prioritizes the upper tier(s) of storage for the throttling units prioritized by throttling policy 316, as shown in FIGS. 3-4.

The illustrated process begins at block 600 and thereafter proceeds to block 602, which illustrates storage controller 312 calculating a data capacity limit (i.e., a maximum amount of data) that can be stored per throttling unit in at least first tier storage devices 322 (and optionally in one or more additional tiers of data storage devices 320). In a preferred embodiment, the data capacity limits are based at least in part on the throttling limits, which are presumed to reflect the relative storage priorities of the throttling units. In at least some embodiments, the data capacity limits are further based on storage parameter 318, such as the total capacity of first tier storage devices 322 and the relative access latencies of first tier storage devices 322 and lower tier storage devices (e.g., Nth tier storage devices 324).

For example, in one exemplary configuration, throttling policy 316 may specify a set $T_{Limit}$ of throttling limits applicable to client platform(s), volume(s), and/or volume group(s) such as:

$T_{Limit}$={'Client300a': '100 IOPS';'Client300b': '200 IOPS',Volume302a': '400 IOPS',Volume-Group305': '800IOPS'}

Storage parameters 318 may further specify the storage capacity ($C_{HT}$) of first tier storage devices 322 (e.g., 1000 GB) and indicate the relative access latencies of first tier storage devices 322 and Nth tier storage devices 324 with a factor D (e.g., 1000).

From this information regarding the throttling limits, and optionally, one or more additional storage parameters, storage controller 312 calculates the respective data capacity limit for each throttling unit. For example, in one embodiment, the data capacity limit for a throttling unit $T_u$ can be given by:

$$C_{Limit}(T_U) = Q * T_F * (C_{HT}/T_L) \qquad \text{Eq. 1}$$

where:
$C_{Limit}(T_U)$ is a data capacity limit in first tier storage for throttling unit $T_U$;
Q is a QoS parameter;
$T_F$=Throttling factor derived from the lowest configured throttling limit $T_L$ in $T_{Limit}$;
$C_{HT}$=Total storage capacity of first tier storage devices; and
$T_L$=Lowest configured throttling limit in $T_{Limit}$.

As shown at block 604 of FIG. 6, storage controller 312 can then calculate a number of extents 304 that each throttling unit is permitted to store in first tier storage devices 322 based on the data capacity limits $C_{Limit}(T_U)$ calculated at block 602. For example, in one exemplary embodiment, the number of extents $N_E$ that a given throttling unit is permitted to store in first tier storage devices 322 can be determined by the following relation:

$$N_E = C_{Limit}(T_U)/E_S \qquad \text{Eq. 2}$$

where $E_S$ is the extent size generally equal to a fixed number of blocks of storage.

In conventional storage system implementing a heat-tiered storage policy, heat-based migration of data between tiers is typically performed solely on a fixed time interval, such as once per day. In the process of FIG. 6, storage controller 312 alternatively or additionally performs heat-based data migration between storage tiers 322, . . . , 324 based on a migration trigger, as shown at block 606. For example, in one embodiment, storage controller 312 determines at block 606 whether migration should be performed utilizing a cost-benefit analysis, such as that described by the following equation:

$$M_T = T_{GH}/\Sigma(T_L * C_{Limit}(T_U) * P_M) \qquad \text{Eq. 3}$$

where:
- $M_T$ is a Boolean integer {0, 1} indicating whether or not to perform a heat-based data migration;
- $T_{GH}$=Throughput gain when data is migrated to the first tier storage devices;
- $T_L$=Throughput when requests are served from Nth tier storage devices;
- $C_{Limit}(T_U)$=Data capacity limit in the first tier storage device per throttling unit; and
- $P_{ME}$=Estimated power consumption in order to migrate single extent.

In this exemplary relation, storage controller 312 considers not only the throughput gain that can be achieved by migrating hotter extents 304 to first tier storage devices 322, but also the power consumption (and thus cost) incurred by performing the migration. If the performance gain outweighs the cost, storage controller 312 determines to performs the heat-based data migration and otherwise determines to defer the heat-based migration until the performance gain justifies the associated cost (or, in some embodiments, until a migration interval such as one week has elapsed since the last migration).

In response to storage controller 312 determining at block 606 not to perform a heat-based migration of data between storage tiers 322, . . . , 324, the process passes to block 610, which is described below. If, however, storage controller 312 determines at block 606 to perform a heat-based migration of data between storage tiers 322, . . . , 324, storage controller 312 migrates extents 304 between tiers 322, . . . , 324 in accordance with their respective heat attributes (block 608). For example, assuming a heat attribute range of 0 . . . 100, where 0 corresponds to a minimum access frequency and 100 corresponds to a maximum access frequency, storage controller 312 may perform the necessary migrations of extents 304 to place extents 304 having a heat greater than 80 in first tier storage devices 322, extents 304 having a heat of 31 to 80 in a second tier of storage devices (not illustrated), and extents 304 having a heat of 30 or less in Nth tier storage devices 324. As indicated by arrows in FIGS. 3-4, this migration may entail storage controller 312 migrating various extents 304 upward or downward between storage tiers to achieve the desired heat-based distribution determined by tiering policy 314. As noted above, however, the migration performed at block 608 is subject to the maximum number of extents calculated for each throttling unit at block 604. Consequently, at block 608, hot extents 304 for a given throttling unit are migrated to first tier storage devices 322 only up until the data capacity limit for that throttling unit is reached or the supply of hot extents 304 to be migrated is exhausted. Following block 608, the process of FIG. 6 passes to block 610.

Block 610 depicts storage controller 312 determining whether or not any update has been made to throttling policy 316 or to storage parameters 318. If not, the process passes to block 606, which has been described. If, however, storage controller 312 determines at block 610 that at least one of throttling policy 316 or storage parameters 318 has been updated, the process of FIG. 6 returns to block 602 and following blocks, which have been described.

As has been described, in at least one embodiment, a data storage system has multiple tiers of data storage including an upper tier having a lower access latency and a lower tier having a higher access latency. A storage controller of the data storage system implements throttling limits regulating access to data in the data storage system for a plurality of throttling units sharing the data storage system. The storage controller also tracks access frequencies of extents in the data storage system. The storage controller migrates extents among the multiple tiers based on the access frequencies of the extents and the throttling limits implemented for the throttling units.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been particularly shown as described with reference to one or more preferred embodiments, it will be understood by those skilled in the art that various changes in form and detail may be made therein without departing from the spirit and scope of the invention. For example, although aspects have been described with respect to a data storage system including a flash controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude signal media per se, transitory propagating signals per se, and energy per se.

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method of controlling a data storage system having multiple tiers of data storage including an upper tier having a lower access latency and a lower tier having a higher access latency, the method comprising:

a storage controller implementing throttling limits regulating access to data in the data storage system for a plurality of throttling units sharing the data storage system;

the storage controller tracking access frequencies of extents of file system objects in the data storage system;

the storage controller determining whether or not to migrate extents between the multiple tiers based on a throughput gain that can be achieved by migration of the extents and a total power consumption to perform the migration; and based on a determination to migrate the extents, the storage controller migrating the extents among the multiple tiers based on the access frequencies of the extents and the throttling limits implemented for the throttling units.

2. The method of claim 1, wherein:

the method further includes the storage controller calculating a respective storage capacity for each of the plurality of throttling units; and the migrating further includes the storage controller migrating extents between the multiple tiers based on the respective storage capacity calculated for each of the plurality of throttling units.

3. The method of claim 1, wherein:
the migrating further includes the storage controller migrating extents between the multiple tiers based on maximum throughputs of the multiple tiers.

4. The method of claim 1, wherein the plurality of throttling units includes at least one of a set including a volume and a volume group.

5. The method of claim 1, wherein the plurality of throttling units includes at least one of a set including a cloud consumer, host device, Internet Protocol (IP) address, and workload.

6. A data storage system, comprising:
a storage controller for data storage including an upper tier having a lower access latency and a lower tier having a higher access latency, wherein the controller is configured to perform:
the storage controller implementing throttling limits regulating access to data in the data storage system for a plurality of throttling units sharing the data storage system;
the storage controller tracking access frequencies of extents of file system objects in the data storage system;
the storage controller determining whether or not to migrate extents between the multiple tiers based on a throughput gain that can be achieved by migration of the extents and a total power consumption to perform the migration; and
based on a determination to migrate the extents, the storage controller migrating extents among the multiple tiers based on the access frequencies of the extents and the throttling limits implemented for the throttling units.

7. The data storage system of claim 6, wherein:
the storage controller is configured to calculate a respective storage capacity for each of the plurality of throttling units; and
the migrating further includes the storage controller migrating extents between the multiple tiers based on the respective storage capacity calculated for each of the plurality of throttling units.

8. The data storage system of claim 6, wherein:
the migrating further includes the storage controller migrating extents between the multiple tiers based on maximum throughputs of the multiple tiers.

9. The data storage system of claim 6, wherein the plurality of throttling units includes at least one of a set including a volume and a volume group.

10. The data storage system of claim 6, wherein the plurality of throttling units includes at least one of a set including a cloud consumer, host device, Internet Protocol (IP) address, and workload.

11. The data storage system of claim 6, and further comprising the data storage.

12. A computer program product, the computer program product comprising a computer readable storage medium having program instructions embodied therewith, the program instructions executable by a storage controller of a data storage system including an upper tier having a lower access latency and a lower tier having a higher access latency to cause the storage controller to perform:
a storage controller implementing throttling limits regulating access to data in the data storage system for a plurality of throttling units sharing the data storage system;
the storage controller tracking access frequencies of extents of file system objects in the data storage system;
the storage controller determining whether or not to migrate extents between the multiple tiers based on a throughput gain that can be achieved by migration of the extents and a total power consumption to perform the migration; and
based on a determination to migrate the extents, the storage controller migrating extents among the multiple tiers based on the access frequencies of the extents and the throttling limits implemented for the throttling units.

13. The computer program product of claim 12, wherein:
the program instructions, when executed, cause the storage controller to calculate a respective storage capacity for each of the plurality of throttling units; and
the migrating further includes the storage controller migrating extents between the multiple tiers based on the respective storage capacity calculated for each of the plurality of throttling units.

14. The computer program product of claim 12, wherein:
the migrating further includes the storage controller migrating extents between the multiple tiers based on maximum throughputs of the multiple tiers.

15. The computer program product of claim 12, wherein the plurality of throttling units includes at least one of a set including a volume and a volume group.

16. The computer program product of claim 12, wherein the plurality of throttling units includes at least one of a set including a cloud consumer, host device, Internet Protocol (IP) address, and workload.

* * * * *